(12) United States Patent
Adrick et al.

(10) Patent No.: US 8,745,671 B2
(45) Date of Patent: Jun. 3, 2014

(54) SYSTEMS AND METHODS FOR PRESENTATION OF DIGITAL MEDIA AT A MOBILE PLATFORM

(75) Inventors: Jay C. Adrick, Cincinnati, OH (US); Robert Samuel Matheny, Jr., Zebulon, NC (US)

(73) Assignee: Imagine Communications Corp., Englewood, CO (US)

( * ) Notice: Subject to any disclaimer, the term of this patent is extended or adjusted under 35 U.S.C. 154(b) by 346 days.

(21) Appl. No.: 12/759,373

(22) Filed: Apr. 13, 2010

(65) Prior Publication Data

US 2011/0252450 A1 Oct. 13, 2011

(51) Int. Cl.
*H04N 7/16* (2011.01)
*H04N 21/414* (2011.01)

(52) U.S. Cl.
CPC ... *H04N 21/41407* (2013.01); *H04N 21/41415* (2013.01)
USPC .......................................................... 725/62

(58) Field of Classification Search
CPC ................. H04N 21/41415; H04N 21/41407; H04H 20/63
USPC ..................................................... 725/62, 74
See application file for complete search history.

(56) References Cited

U.S. PATENT DOCUMENTS

| 7,509,267 | B1 | 3/2009 | Yarmolich et al. | |
| 8,204,961 | B2* | 6/2012 | Kim et al. | 709/218 |
| 2001/0032127 | A1* | 10/2001 | Lewis | 705/14 |
| 2003/0154485 | A1* | 8/2003 | Johnson et al. | 725/89 |
| 2005/0289611 | A1* | 12/2005 | Taki | 725/75 |
| 2006/0159109 | A1* | 7/2006 | Lamkin et al. | 370/401 |
| 2006/0168616 | A1* | 7/2006 | Candelore | 725/34 |
| 2006/0236342 | A1* | 10/2006 | Kunkel et al. | 725/52 |
| 2008/0060003 | A1* | 3/2008 | Nocifera et al. | 725/35 |
| 2008/0060005 | A1* | 3/2008 | Shanks et al. | 725/38 |
| 2008/0168512 | A1* | 7/2008 | Nguyen | 725/105 |
| 2009/0030802 | A1* | 1/2009 | Plotnick et al. | 705/14 |
| 2009/0199230 | A1* | 8/2009 | Kumar et al. | 725/32 |
| 2010/0134701 | A1* | 6/2010 | Eyer | 348/731 |
| 2010/0138871 | A1* | 6/2010 | Anthru et al. | 725/54 |
| 2010/0185746 | A1* | 7/2010 | Suh et al. | 709/217 |

OTHER PUBLICATIONS

Publication, "ATSC-Mobile DTV Standard, Part 3—Service Multiplex and Transport Subsystem Characteristics", Advanced Television Systems Committee, Inc., Oct. 1, 2009, pp. 1-85.
Press Release, "Harris Corporation, LG Electronics Demonstrate IP-Based Delivery Platform for MPH Mobile DTV System", bearing date Apr. 13, 2008, pp. 1-3.
Press Release, "Harris Corporation, MPH Platform and infoCaster Digital Signage to Power Nation's First Public Deployment of Mobile DTV", Date Apr. 19, 2010, pp. 1-3.

* cited by examiner

*Primary Examiner* — Junior Mendoza
(74) *Attorney, Agent, or Firm* — Tarolli, Sundheim, Covell & Tummino LLP

(57) ABSTRACT

According to one embodiment, an apparatus is disclosed for receiving and providing an aggregate video feed on a mobile platform. The apparatus can include a receiver configured to receive a mobile digital television signal. A file assembler is configured to provide a broadcast media stream and at least one media file from the mobile video television signal. A media library stores the at least one media file. A media player configured to selectively retrieve the at least one media file from the media library, to construct an aggregate video feed from the retrieved at least one media file and the broadcast media stream, and to output the aggregate video feed.

21 Claims, 3 Drawing Sheets

SYSTEMS AND METHODS FOR PRESENTATION OF DIGITAL MEDIA AT A MOBILE PLATFORM

TECHNICAL FIELD

The field of the disclosure relates to a communications system and, more particularly, to systems and methods for display of digital media at a mobile platform.

BACKGROUND

Televisions and other display devices are generally used for receiving and displaying broadcast signals from such sources as terrestrial transmissions, cable transmissions and/or satellite transmissions. Such transmissions can be disseminated to a wide number of televisions and to numerous geographic regions. With the availability of mobile devices with high-resolution displays, large memories, and significant processing power, efforts have been made to provide television to mobile devices.

SUMMARY

This disclosure relates generally to systems and methods for display of digital media at a mobile platform.

One embodiment provides an apparatus for receiving and providing an aggregate video feed on a mobile platform. The apparatus can include a receiver configured to receive a mobile digital television signal. For example, the mobile digital television signal can be transmitted from a headend according to a predetermined protocol. A file assembler is configured to provide a broadcast media stream and at least one media file from the mobile video television signal. A media library stores the at least one media file. A media player configured to selectively retrieve the at least one media file from the media library, to construct an aggregate video feed from the retrieved at least one media file and the broadcast media stream, and to output the aggregate video feed.

Another embodiment provides a method for providing digital television to a mobile platform can include encoding a mobile digital television signal to include a broadcast media stream and at least one media file. The mobile digital television signal is transmitted and received at a receiver associated with the mobile platform. The broadcast media stream and the at least one media file are extracted from the received mobile video television signal. The at least one media file is stored at the mobile platform in a media library comprising a plurality of media files. An aggregate video feed is constructed from the broadcast media stream and a set of at least one media file selected from the media library. A representation of the aggregate video feed can be displayed at a display associated with the mobile platform.

Still another embodiment provides a computer readable medium storing executable instructions for displaying digital television on a mobile platform, the executable instructions, when provided to a computer, being configured to perform a method that includes extracting a broadcast media stream, control data defining rules for a plurality of geographic regions, and at least one media file from a mobile video television signal. The at least one media file is stored in a library comprising a plurality of media files. The method also includes determining a position of the mobile platform and selecting at least one media file from the library according to the determined position of the mobile platform and the rules defined by the control data. An aggregate video feed is constructed from the selected at least one media file and the broadcast media stream and is provided for presentation on a display.

DETAILED DESCRIPTION

Figure 1:
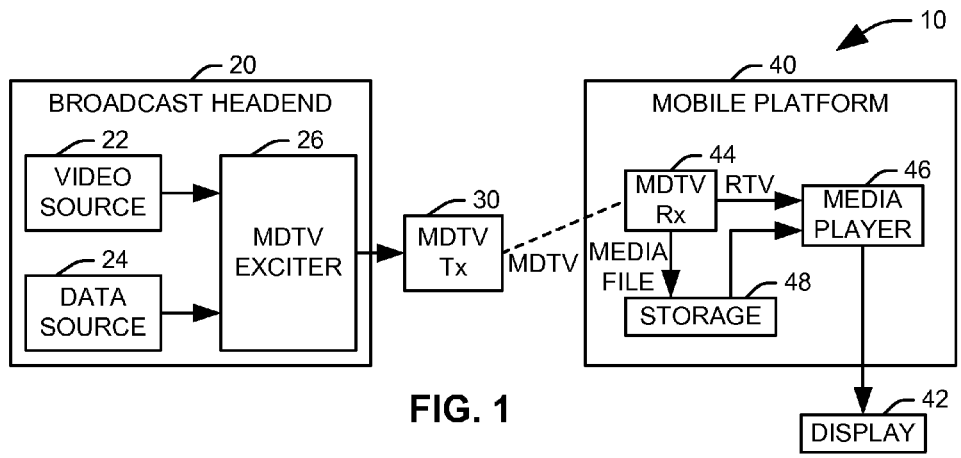
FIG. 1 illustrates a system for providing digital television and digital signage in accordance with one embodiment.

FIG. 1 illustrates an example of a system 10 for providing digital television and digital signage that can be implemented in accordance with one embodiment. The example system 10 is configured to provide a broadcast mobile digital television (MDTV) stream along with media data as auxiliary data. Thus, a single broadcast signal can include both the MDTV stream and the media data to enable concurrent downstream presentation of both the broadcast program (e.g., corresponding to a real-time broadcast) and the other media representing digital signage.

By way of example, a broadcast headend 20 can include a video source 22, which provides at least one stream of broadcast digital video, and a data source 24 that provides data at least one media file. As used herein, the term "broadcast digital video" can include video only or both audio and video. A mobile digital television exciter 26 is configured to encapsulate each of the digital video and one or more media files as packet data and modulate the data into a radio frequency signal.

In one example embodiment, the digital video is provided as a mobile digital television payload, and the media file is provided as auxiliary data within the broadcast signal. The radio frequency signal is provided to a transmitter 30 configured to broadcast the MDTV signal within a known broadcast region and according to predetermined broadcast protocol. For example, the broadcast signal can be provided as a standard mobile digital television stream, such as in accordance with the Advanced Television Systems Committee—Mobile/Handheld (also known as ATSC MH or ATSC A/153). The ATSC A/153 standard employs channel coding mechanisms to accommodate for Doppler shift and multipath radio interference typically present in mobile environments. In addition, to being capable of transmitting broadcast digital video over one or more channels for receipt by a digital mobile platform, Part 3 "*Service Multiplex and Transport Subsystem Characteristics*" of the ATSC A/153 standard covers the service multiplex and transport subsystem, which Part 3 of the standard is incorporated herein by reference in its entirety.

The above-incorporated Part 3 of the ATSC A/153 standard specifies various layers of the internet protocol (IP) stack. As a further example, the system 10 can employ different protocols of Part 3 for transmission of the broadcast digital video and transmission of the non-real-time media files. For instance, the digital broadcast video can be transmitted according to the UniDirectional Protocol (UDP), as an example, and the media files can be transmitted in the signal using FLUTE over Asynchronous Layered Coding (ALC)/ Layered Coding Transport (LCT), as an example. A mobile platform 40 downstream can receive and extract the digital broadcast video and the media files according to the protocols that such data is transmitted. For instance, a receiver assembly 44 is configured to reduce the MDTV signal to computer readable form for processing thereof. The broadcast digital video stream can be provided to a media player 46 to be formatted and provided to the display 42, such as for real-time playout. The display can be fixed to the mobile platform 40. For instance, the display 42 can be mounted in a vehicle (e.g., a public transportation vehicle, such as a bus, train, taxi, airplane or boat) comprising the mobile platform 40. Each original media file can be re-assembled and stored in local storage 48 local by the mobile platform 40 (e.g., by implementing the FLUTE protocol). Appropriate header information can be inserted at the headend 20 (e.g., as part of its protocol) for each media file to facilitate the assembly of each media file at the mobile platform 40.

In this example, the media player 46 is programmed and configured to retrieve media files from the storage 48 and combine selected media files and the broadcast video into an aggregate video feed for presentation on the display 42. The media player 46 can selectively retrieve one or more media files for concurrent playout with the broadcast digital video stream based on one or more preprogrammed rules. The concurrent playout of the media files from the storage can correspond to digital signage functionality. Thus, a given media file in the storage 48 further can be updated periodically, such as for weather, news or other information media that can change. Alternatively or additionally, a set of media files (e.g., ad content or other static type of media) can be stored in the local storage 48, which can be selectively retrieved and combined with the digital video stream to provide the aggregate stream to the display 42.

As a further example, the media player 46 can employ rules to specify a frequency at which a given media file is to be updated for output to the display. As another example, the rules can specify conditions based on scheduling data (e.g., timing data and/or location data) at which a given media file (e.g., an ad) is to be changed for output to the display. Those skilled in the art will understand and appreciate various rules and scheduling that can be implemented to automatically (e.g., not requiring any user input at the mobile platform) update the aggregate feed with one or more media files.

It will be appreciated that the example system 10 provides a number of non-limiting advantages by providing the digital television and digital signage data as separate components (e.g., using different transmission protocols) of a single mobile digital television signal. The use of a combined signal allows the mobile platform 40 to utilize only a single receiver 44, which can reduce complexity and cost. Further, by providing the media files representing non-real-time media separately from the broadcast (e.g., real-time) video stream, it is possible to provide the non-real-time media at a much higher resolution than if the non-real-time media and the digital video were part of the same video stream. As a result, the system 10 can allow for legible digital signage within a smaller area of the display. Accordingly, a system in accordance with embodiments disclosed herein allows for efficient use of the resources available at the mobile platform 40.

Figure 2:
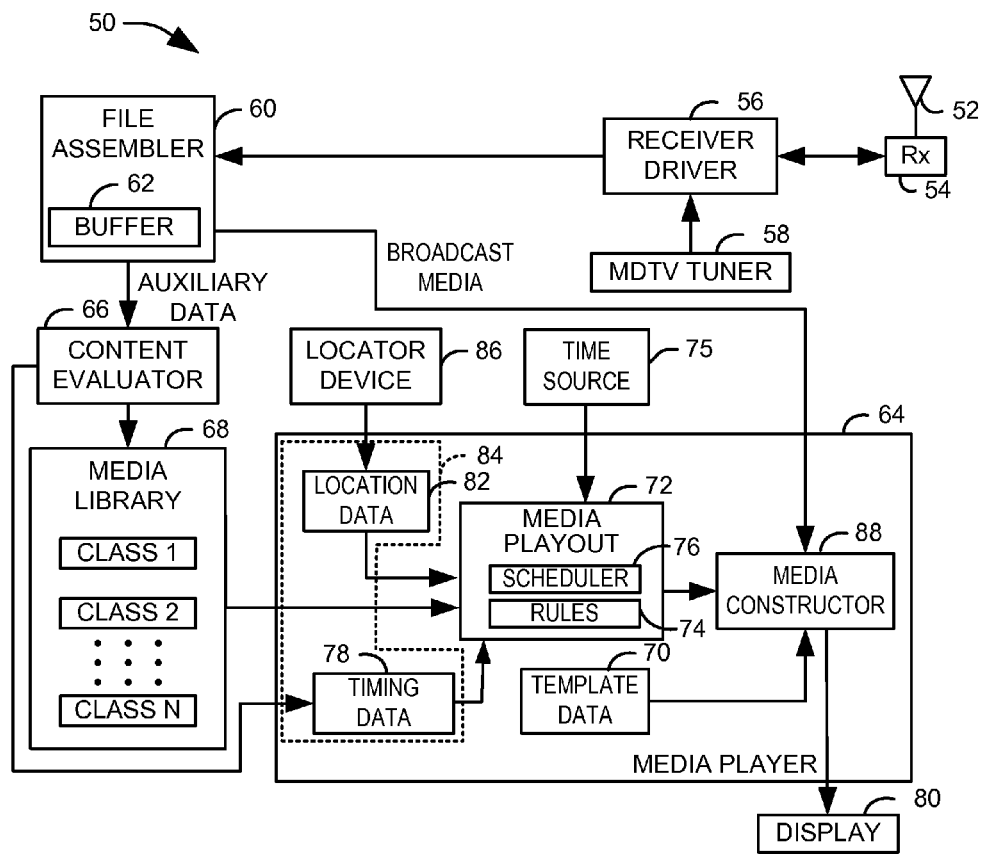
FIG. 2 illustrates an example mobile platform configured to provide digital television and digital signage in accordance with one embodiment.

FIG. 2 illustrates an example of a mobile platform 50 configured to provide concurrently digital television and non-real time media in accordance with one embodiment. The mobile platform 50 receives at an MDTV antenna 52 a mobile digital television (MDTV) signal. The MDTV signal containing a broadcast video stream and auxiliary data comprising at least one media file. As mentioned above, for example, the broadcast video stream can be provided according to UDP and each media file can be provided according to a different transport protocol, such as FLUTE over ALC/LCT, supported by the above-incorporated Part 3 of the ATSC A/153 standard, as examples. The MDTV antenna 52 can include one or more antennas configured to receive broadcast MDTV transmissions.

A MDTV receiver 54 is configured to downconvert and demodulate the received signal to produce a stream of MDTV data packets. The MDTV receiver 54 can be controlled by a receiver driver 56 that is implemented in software, dedicated hardware or a combination of hardware and software. For instance, the MDTV receiver can be configured to regulate the operation of the receiver, provide error checking for the signal based on any forward error correction present in the signal, and extract the error corrected signal. In the illustrated implementation, the receiver driver 56 can further be configured to tune the receiver to a particular channel of interest in a network according to input from an associated MDTV tuner 58, which operates according to the same protocol that the transmitter sends the signal.

The receiver driver outputs the error corrected signal as a stream of packet data and provide to a file assembler 60. In this example embodiment, the file assembler 60 is configured to reassemble the broadcast digital video stream and the media files which were transmitted separately in the MDTV signal. For instance, the file assembler 60 is configured to detect the respective protocols (e.g., UDP and FLUTE) via which the broadcast digital video and media files were transmitted and to reassemble the respective digital broadcast stream and the media files. The file assembler 60 provides the broadcast media stream to a media player 64. The file assembler also provides each media file as auxiliary data.

In the example of FIG. 2, the media files comprising the auxiliary data are provided to a content evaluator 66. The content evaluator 66 is configured to associate each file with an associated file class (e.g., a category of media) and route the file to an appropriate location within a media library 68. For example, the content evaluator 66 can parse a header or similar identifier that is part of each of the media files and ascertain an appropriate file class, indicated at classes 1 through N, where N is a positive integer denoting the number of classes of media files. There can be any number of N classes, which can further depend on the number of frames. As used herein, a frame corresponds to a respective area of the display that is populated with media from a given source. Thus in the example of FIG. 2, the sources can include each selected media file and the digital broadcast video stream, which can be provided in an aggregate stream for concurrent presentation on the display 80.

It will be appreciated that a given "file class" can include all files that have a particular file type (e.g., static image, video, audio, etc.) as well as related type of content. For example, a first file class can include weather reports intended for display at a first frame of the display, a second file class can include ad content intended for display at a second frame, and a third file class can include file schedules that instruct the media player to rotate content at a particular frame of the display. It will further be appreciated that the term "location" in the media library is used here abstractly, and the various locations could simply comprise different folder assignments within the media library 68.

In accordance with embodiments disclosed herein, the media player 64 is configured to provide an aggregate video feed containing the broadcast video stream and at least one other media file. To this end, one or more rendering templates can be stored as template data 70 at the mobile platform 50 to facilitate organization of the various selected media into a coherent video display. A given rendering template 70 divides the available resolution of an associated display 80 into a plurality of distinct regions, referred to herein as "frames".

There can be any number of one or more templates stored in the template data 70. As one example, a particular rendering template 70 can be preselected for use and be stored at the platform 50. Alternatively or additionally, the media player 64 can be configured to switch among a plurality of templates according to instructions (e.g., triggered by one or more predefined conditions), such as can be carried in the auxiliary data of the mobile digital television signal or be responsive to other conditions (e.g., timing information and/or location information for the mobile platform). By way of example, each frame of a rendering template 70 can be reserved for a particular file class within the media library 68. That is, one or more media file in a given class can operate as a media source for a specified frame in the template, which is provided in the aggregate output feed to the display 80.

The media player 64 can include a playout component 72 that controls how each frame in the template is updated. For instance, the playout component 72 can implement a set of one or more rules 74. Different rules can be set for each frame defined by the template data. For the example where each of the N classes of media is a source for a respective frame, there will be N rule sets. Thus, the rules 74 utilized by the playout component 72 to update a frame can depend on the class of media that has been assigned for each respective frame. Rules can be as simple as to specify a timing interval for updating a frame with the media file (e.g., for a class of media, such as weather or news, that changes periodically). The media file for each such class of media thus can be sent from the headend in the MDTV signal to accommodate the interval between the periodic updates.

More complex rules and scheduling can be established for other classes of media. The playout component 72 can also include a scheduler 76 that can be programmed to selectively retrieve one of a plurality of media files in another class that stores a plurality of media files. The scheduler 76 can control scheduling playout of media files based on timing data 78, location data 82, or a combination thereof. The location data 82 and the timing data 78 can collectively define scheduling data 84 based on which the playout component 72 can selectively retrieve one or more media files for concurrent playout with the broadcast media stream.

The timing data 78 can determine when each of the media files is to be played out, which can include one or more specified times for each media file of the class. For instance, the platform 50 can include a time source (e.g., a clock) 75 that provides an indication of chronological time that can be utilized by the playout component 72, such as by one or more of the rules and/or by the scheduler 76, for controlling selection and retrieval of media files. Alternatively or additionally, the timing data 78 can specify an update rate for sequencing through each of the media files. In this way, the various stored media files from the multi-file class can be rotated into a given frame by the scheduler 76 according to timing data 78. The timing data 78 and/or the rules 74 can be preprogrammed or the timing data 78, the rules 74 or both the timing data and rules can be programmable as control data that is provided as part of the auxiliary data in the MDTV signal (e.g., via the FLUTE over ALC/LCT protocol or another protocol that is different from the protocol used to transmit the broadcast video). The content evaluator 66 thus can be configured to extract the control data and provide it to the media player 64.

The scheduling of playout of media files for a given media class further can be subject to the rules 74. For instance, the rules for a given media class can include a hierarchical rule set that can be programmed to control which media file to retrieve for a given frame based on the timing data, the location data or any combination thereof or other predefined conditions. Certain conditions and rules having a higher priority can be afforded priority in selecting which media file(s) are retrieved. For instance, the condition can be based on a geographic location of the mobile platform 50

As a further example, the mobile platform 50 can include a locator device 86, such as a global positioning system (GPS) receiver, that provides a location of the mobile platform. In this implementation, the file schedule for a given frame can define a plurality of geographic regions, each associated with a set of media files within a media class. When the mobile platform is in a first geographic region, the rule can specify that a selected media file or a selected sequence of media files be provided to a respective frame. For instance, this can achieve targeted location-based advertising on the display 80, such that advertisements for establishments proximate to the mobile platform 50 can be given priority.

The playout component 72 thus can provide a media constructor 88 one or more media files for playout of each media file in its associated frame. The timing for updating each frame in the template with media files from the media library 68 can vary according to the rules 74 and scheduler 76 established for each media class. The media constructor 88 is configured to provide an aggregate video feed based on the template data 70, which aggregate feed includes both the broadcast video and one or more selected media files. As used herein, an "aggregate video feed" is intended to identify a video signal that includes separate content from multiple sources, such as the broadcast video and the stored media files described herein. For example, each of the multiple sources can be rendered as an image for each respective frame on the display 80 in which the broadcast video is updated continuously to provide real-time video and each other frame is updated automatically by the playout component as disclosed herein.

Figure 3:
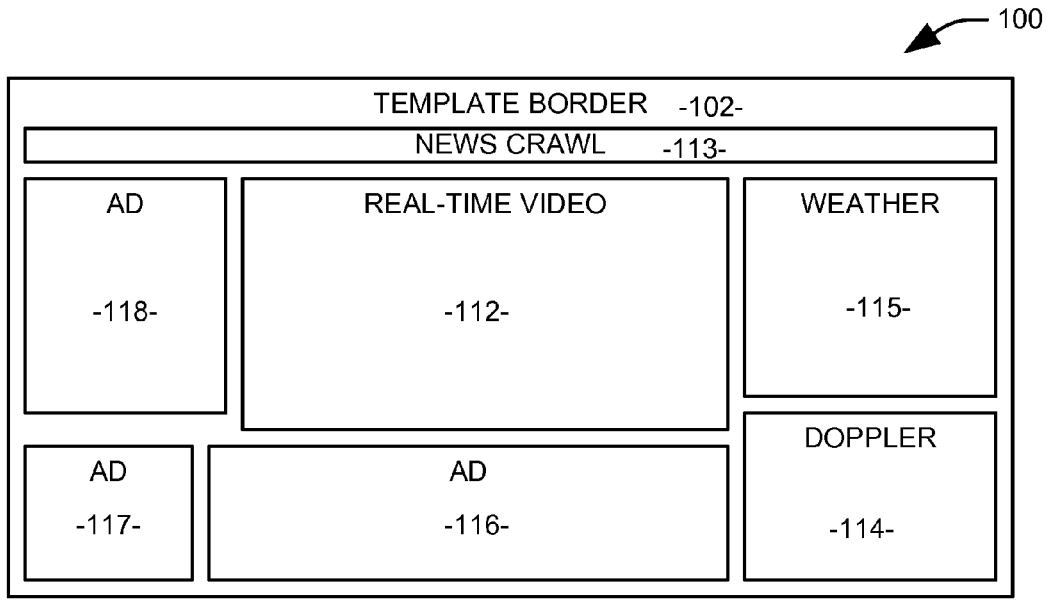
FIG. 3 illustrates an example of a display of an aggregate video feed in accordance with one embodiment.

An example of a resulting aggregate feed 100 that can be provided on a display is illustrated as FIG. 3. The resulting image can be considered non-interactive since no user interface is associated with the image. However, in other embodiments an interactive element (e.g., a graphical user interface) may be provided as part of the non-real time media that is automatically selected and displayed from the feed.

In the example of FIG. 3, the feed 100 includes the template border 102 and the plurality of media frames 112-118 as they might appear on the display 80. A first frame 112 of the template can be reserved for continuous display of the broadcast video stream as an example. A second frame 113 can carry a news crawl, provided as a video file in the auxiliary data as an example. The second frame 113 can have an associated rule set, stored at the mobile platform at installation, which instructs the playout component 72 to retrieve a new news crawl from the media library 68 at a predetermined interval (e.g., every three to four minutes). To this end, the mobile television signal can provide, as auxiliary data, a new video for the new crawl at substantially the same interval.

A third frame 114 can present a Doppler radar video, as an example, such as can be sourced by a video file stored in the media library 68. Like the second frame 113, the third frame 114 can have an associated rule set, stored at the mobile platform at installation, which instructs the playout component 72 to retrieve a new Doppler radar video from the media library 68 at a predetermined interval (e.g., every seventy minutes). Like the news crawl, the Doppler image can be replaced periodically as part of the auxiliary data carried by the mobile television signal. A fourth frame 115 can carry a weather forecast provided as a static image, provided periodically (e.g., every few hours) as auxiliary data in the mobile television signal. Like the second and third frames 113 and 114, the fourth frame 115 can be governed by a preloaded file schedule to rotate in new weather forecasts at predetermined intervals.

As a further example, each of the fifth, sixth, and seventh frames 116-118 can be used to carry advertising content. In general, the advertisements can be carried as static images, although it will be appreciated that they can contain audio and/or video content. Each frame 116-118 can have an associated schedule and rule set to instruct the playout component 72 to retrieve a new advertisement from the media library 68 and insert it into the aggregate video feed. The timing data for each frame can be provided to the mobile platform 50 at a predetermined interval (e.g., daily) to control the placement of advertisements in the respective frames 116-118.

Figure 4:
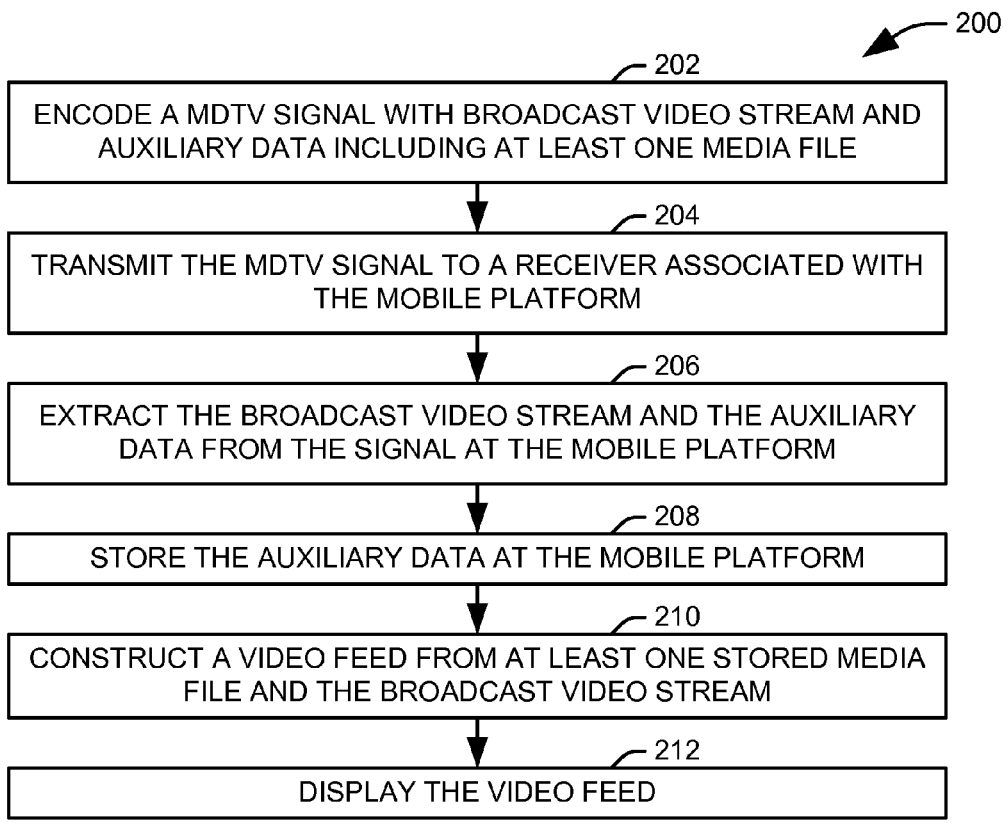
FIG. 4 illustrates an example method for providing digital television and digital signage to a mobile platform in accordance with one embodiment.
Figure 5:
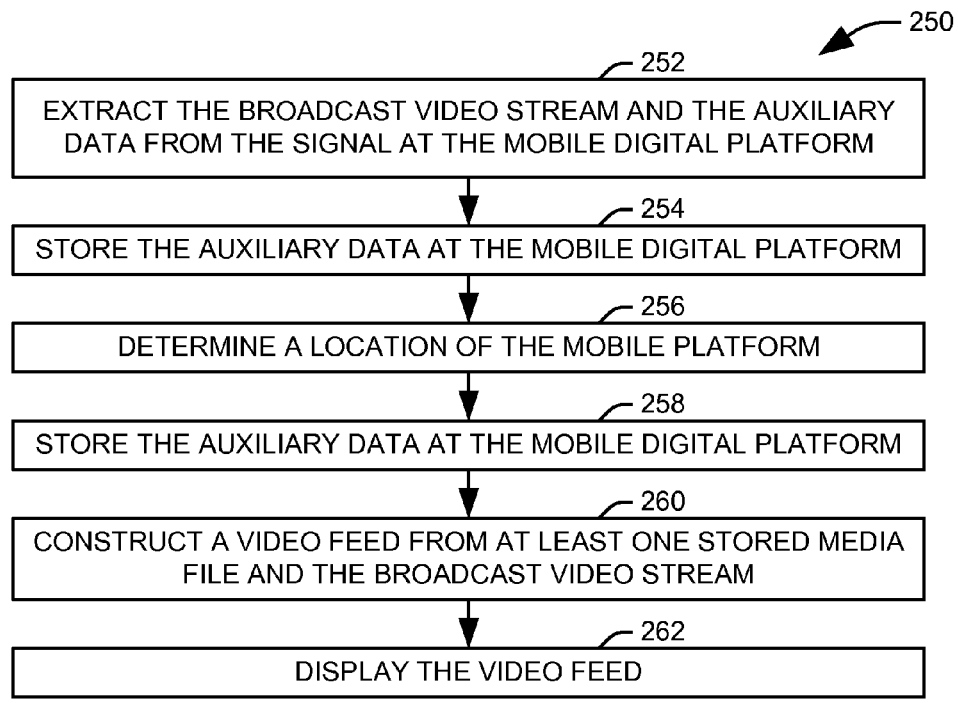
FIG. 5 illustrates a method for providing digital television and location-sensitive digital signage to a mobile platform in accordance with one embodiment.

In view of the structural and functional features described above, certain methods can further be appreciated with reference to FIGS. 4 and 5. It is to be understood and appreciated that the illustrated actions, in other embodiments, may occur in different orders or concurrently with other actions. Moreover, not all features illustrated in FIGS. 4 and 5 may be required to implement a method according to embodiments disclosed herein. It is to be further understood that the following methodology can be implemented in hardware (e.g., one or more processors, such as in a computer or computers), software (e.g., stored in a computer readable medium or as executable instructions running on one or more processors), or as a combination of hardware and software.

FIG. 4 illustrates an example method 200 for providing digital television and digital signage to a mobile platform. At 202, a mobile digital television signal with broadcast video stream and auxiliary data comprising at least one media file can be encoded by a transmitter. For example, the transmitter may be the MDTV transmitter 30 in FIG. 1. Further as an example, a plurality of media files can be prepared as packet data and inserted into a mobile digital television stream in accordance with the ATSC A/153 mobile digital television stream. At 204, the mobile digital television signal is transmitted to a mobile platform. For example, the mobile platform may be the mobile platform 40 of FIG. 1. In general, this transmission will take the form of a radio frequency broadcast over an associated broadcast region for the transmitter, although it will be appreciated that the signal can be transmitted via other modalities.

At 206, the broadcast video stream and the auxiliary data are extracted from the mobile video television signal. For example, the mobile MDTV receiver 44 provided in the mobile platform 40 in FIG. 1 can be configured to perform such extraction. For example, the signal can be demodulated and the error coding can be removed, with the resulting packet data reassembled into the broadcast video stream and the various files comprising the auxiliary data, such as according to the respective transmission protocols being implemented for the video stream and auxiliary data. At 208, the files comprising the auxiliary data, including the at least one media file, are stored at the mobile platform. For instance, each of the media files received can be stored in a corresponding class of media files (e.g., according to header information) in a media library.

At 210, an aggregate video feed is constructed from the broadcast video stream and at least one media file from the library. In one implementation, a template, comprising a plurality of frames, can be used to form the aggregate feed. For example, a first frame can be associated with the broadcast video stream and one or more other frames can be associated with respective classes of media files, which can be provided as static images or video. The media files can be automatically selected retrieved and aggregated (e.g., without user intervention) with the broadcast video stream to form the aggregate output video feed. The template can provide a predetermined border and organizational scheme for the various media files to facilitate construction of the aggregate video feed.

In accordance with one embodiment, the media file provided for a given frame within the template can be updated for playout in the aggregate feed according to a locally stored rules. For example, the rules can indicate that a first file would be retrieved for the second frame during a first time period and a second file would be retrieved for the second frame during a second time period. Alternatively, the file schedule can indicate that a first file would be retrieved for the second frame when the mobile platform is in a first geographic region and a second file would be retrieved for the second frame when the mobile platform is in a second geographic region. The rules and manner in which the areas in the aggregate display are updated can vary depending on the media class for each frame such as disclosed herein. The aggregate video feed is displayed at a display associated with the mobile platform at 212, such as display 42 in FIG. 1 as an example.

FIG. 5 illustrates a method 250 for providing digital television and location-sensitive digital signage to a mobile platform in accordance with another embodiment. At 252, the broadcast video stream and the auxiliary data are extracted from the mobile video television signal. For example, the extraction can be performed by the receiver 44 in the mobile platform 40 of FIG. 1. The auxiliary data can include timing and schedule data as well as the media files. The media files can comprise static images, video, audio, or some combination thereof. As described previously, the signal can be demodulated and otherwise processed to provide computer readable packet data, with the resulting packet data reassembled into the broadcast video stream, the file schedule, and the various media files. At 254, the auxiliary data is stored at the mobile platform. For example, the auxiliary data can be stored in storage 48 of the platform 40 of FIG. 1, such as associated with a corresponding class in a media library 68 as demonstrated in FIG. 2.

At 256, a location of the mobile platform is determined. It will be appreciated that any of a number of means can be used for determining the position. In one implementation, the mobile platform can include a global positioning system that provides the position of the mobile platform. Alternatively or additionally, beacons can be located over a region to broadcast location information that can be detected and used to ascertain a location for the mobile platform as it travels throughout the region. For example, a location device 86 as is shown in FIG. 2 can be used to determine the location.

At 258, one or more media file is selected (e.g., by the playout component 72 of FIG. 2) from the library according to the determined position of the mobile platform and the geographic region associated with the media file. For instance, the rules can associate one or more media files as being relevant to a particular geographic region, such that each geographic region has a set of at least one associated media files. When the mobile platform is determined to be within a given geographic region, a media file can be selected from an associated set for inclusion at a display associated with the mobile platform. The rules can further specify timing (e.g., in the form of delay) for retrieving the selected one or more media files for playout.

At 260, an aggregate video feed is constructed (e.g., by the media constructor 88 of FIG. 2) from the selected at least one media file and the broadcast video stream. For example, a template, defining a division of the available resolution of the display into a plurality of frames, can be used to form the aggregate feed. For example, a first frame can be associated with the broadcast video stream, and one or more other frames can be associated with one or more classes of media files. In accordance with one embodiment, at least a second frame can include the selected media file, such that the content of the second frame is responsive to the location of the mobile platform. At 262, the aggregate video feed is provided to the display (e.g., the display 80 in FIG. 2). In one embodiment, each frame that is presented concurrently on the display is fed continuously and automatically with a media file, which frames can be updated based on established rules.

As will be appreciated by those skilled in the art, portions of the embodiments disclosed herein may be embodied as method(s), data processing system(s), or computer program product(s) or medium (media). Accordingly, these portions may take the form of an entirely hardware embodiment, an entirely software embodiment, or an embodiment combining software and hardware. Furthermore, portions disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments disclosed herein are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general-purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 6:
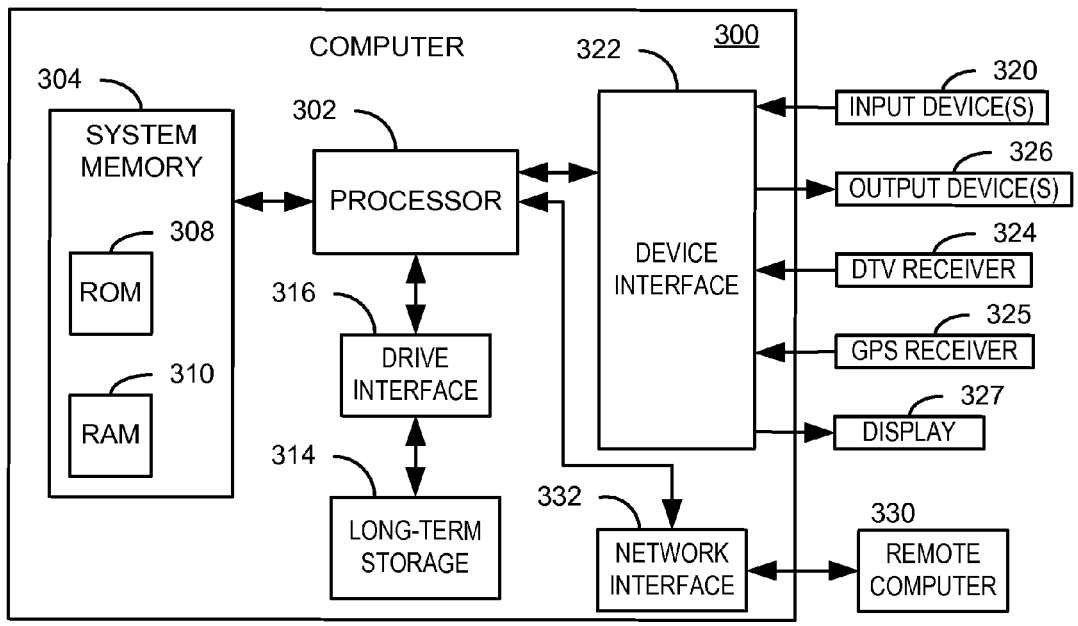
FIG. 6 illustrates a computer system that can be employed to implement all or portions of the systems and methods described herein, such as based on computer executable instructions running on the computer system.

FIG. 6 illustrates an example computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. Dual microprocessors and other multi-processor architectures can also be utilized as the processor 302. The processor 302 and system memory 304 can be coupled by any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) can reside in the ROM 308, generally containing the basic routines that help to transfer information between elements within the computer system 300, such as a reset or power-up.

The computer system 300 can include one or more types of long-term data storage 314, including a hard disk drive, a magnetic disk drive, (e.g., to read from or write to a removable disk), and an optical disk drive, (e.g., for reading a CD-ROM or DVD disk or to read from or write to other optical media). The long-term data storage can be connected to the processor 302 by a drive interface 316. The long-term storage components 314 provide nonvolatile storage of data, data structures, and computer-executable instructions for the computer system 300. A number of program modules may also be stored in one or more of the drives as well as in the RAM 310, including an operating system, one or more application programs, other program modules, and program data.

A user may enter commands and information into the computer system 300 through one or more input devices 320, such as a keyboard or a pointing device (e.g., a mouse). These and other input devices are often connected to the processor 302 through a device interface 322. It will be appreciated that the device interface 322 can include various individual modules for interfacing with various devices. For example, the input devices can be connected to the system bus by one or more a parallel port, a serial port or a universal serial bus (USB). In the illustrated implementation, the device interface 322 can also receive location data from a global positioning system (GPS) receiver 324 or similar device, as well as data from a mobile digital television receiver 325 via appropriate interfaces. One or more output device(s) 326, such as a visual display device or printer, can also be connected to the processor 302 via the device interface 322. In the illustrated implementation, an associated display 327 can receive data from the processor 302 through the device interface 322 to provide a display to a user based on the teachings contained herein.

The computer system 300 may operate in a networked environment using logical connections (e.g., a local area network (LAN) or wide area network (WAN) to one or more remote computers 330. A given remote computer 330 may be a workstation, a computer system, a router, a peer device or other common network node, and typically includes many or all of the elements described relative to the computer system 300. The computer system 300 can communicate with the remote computers 330 via a network interface 332, such as a wired or wireless network interface card or modem. In a networked environment, application programs and program data depicted relative to the computer system 300, or portions thereof, may be stored in memory associated with the remote computers 330.

It will be understood that the above description of embodiments disclosed herein is susceptible to various modifications, changes and adaptations, and the same are intended to be comprehended within the meaning and range of equivalents of the appended claims. The presently disclosed embodiments are considered in all respects to be illustrative, and not restrictive. The scope of the embodiments disclosed herein is indicated by the appended claims, rather than the foregoing description, and all changes that come within the meaning and range of equivalence thereof are intended to be embraced therein.

What is claimed is:

1. An apparatus for receiving and providing an aggregate video feed on a mobile platform comprising:
    a receiver configured to receive a mobile digital television signal;
    a file assembler configured to:
        parse the mobile video television signal to determine a protocol of a broadcast media stream and auxiliary data from the mobile video television signal, the auxiliary data comprising control data and a plurality of media files;
        route the broadcast media stream to a media player based on the determined protocol of the broadcast media stream being a first type;
        route the auxiliary data to a content evaluator based on the determined protocol of the auxiliary data being another type;
    the content evaluator configured to evaluate the auxiliary data for each of a plurality of media files contained therein to determine a class of media and to associate a media file class with each of the plurality of media files based on the determined class of media, each of the plurality of media files of a given media file class being stored in a respective class location of a media library according to the associated media file class thereof; and
    the media player configured to selectively retrieve at least one selected media file from the media library that is selected from the corresponding class location based on to the media file class of the at least one media file determined by the content evaluator, the media player further configured to construct an aggregate video feed from the at least one selected media file and the broadcast media stream in which the broadcast stream and each selected media file is rendered in a respective area of an output display generated from the aggregate video feed, and to output the aggregate video feed.

2. The apparatus of claim 1, the media player comprising a locally stored template comprising a plurality of frames, corresponding to the respective areas of the output display, the broadcast media stream being associated with a first frame of the plurality of frames and a first of the plurality of media classes being associated with a second frame of the plurality of frames, the media player constructing the aggregate video feed from the at least one selected media file, the broadcast media stream, and the locally stored template.

3. The apparatus of claim 1, the file assembler further configured to extract the control data from the auxiliary data, the media player comprising a playout component configured to select the at least one media file from a plurality of media files in the media library to retrieve according to the control data.

4. The apparatus of claim 3, further comprising a locator device configured to provide a location of the mobile platform, the control data defining rules for each of a plurality of geographic regions, such that a first media file is selected from the plurality of media files of a given media file class in response to determining that the mobile platform is within a first geographic region of the plurality of geographic regions and a second media file is selected from the plurality of media files of the given media file class in response to determining that the mobile platform is within a second geographic region of the plurality of geographic regions, such that each of the first and second media files is rendered in a common respective area of the output display based on the location of the mobile platform.

5. The apparatus of claim 3, further comprising a time source configured to provide a current chronological time, the control data comprising timing data that defines a plurality of time periods, such that a first media file is selected during a first time period of the plurality of time periods and a second media file is selected during a second time period of the plurality of time periods, each of the first and second media files belonging to a common media file class and being rendered in a common respective area of the output display based on time.

6. The apparatus of claim 1, further comprising a display fixed within the mobile platform and configured to receive the aggregate video feed and concurrently present the at least one selected media file and the broadcast media stream.

7. The apparatus of claim 1, the media player further configured to store template data that defines a plurality of frames corresponding to the respective areas of the display, each of the plurality of media file classes and the broadcast media stream operating as a source for a designated one of the plurality of frames and being inserted into the designated frame based on which class location each of the at least one media file is assigned in the media library and based on the template data,
    wherein the media player is further configured to automatically replace a first selected media file in the aggregate video feed with another selected media file from a class location of the media library that is the same as the first selected media file in a respective one of the designated frames of the representation without intervention from a user.

8. A system for providing digital television and digital signage at the mobile platform, the system comprising:
    a broadcast headend, comprising:
        a video source configured to provide a broadcast media stream;
        a data source configured to provide an at least one media file; and
        an exciter configured to provide the at least one media file and the broadcast media stream as the mobile digital television signal;
        a transmitter configured to broadcast a mobile digital television signal; and
    the apparatus of claim 1 configured to receive the mobile digital television signal from the broadcast headend.

9. The system of claim 8, the exciter being configured to provide the mobile digital television signal compatible with the Advanced Television Systems Committee A/153 standard.

10. The system of claim 8, the data source being configured to provide the at least one media file at a resolution higher than if such media file were provided within the broadcast media stream.

11. A method for providing digital television to a mobile platform comprising:
    receiving an encoded mobile digital television signal that includes a broadcast media stream and at least one media file at a receiver associated with the mobile platform;

extracting the broadcast media stream and the at least one media file from the received mobile video television signal;

determining a protocol of the broadcast media stream and the at least one media file from the mobile video television signal;

routing the broadcast media stream to a media player and the at least one media file to a media library based on the determined protocol of the broadcast media stream being a first type and the at least one media file being another type;

evaluating the at least one media file to determine a class of media and assigning the at least one media file to a given one of a plurality of predetermined classes based on the determined class of media;

storing the at least one media file at the mobile platform in a respective class location of the media library comprising a plurality of media files according to an associated media file class of the at least one media file;

constructing an aggregate video feed from the broadcast media stream and a set of at least one media file selected from the media library in which the broadcast stream and each selected media file is rendered in a respective area of a representation of the aggregate video feed according to its associated media file class, wherein the broadcast media stream and the respective class location for each selected media file provides a source to populate a given area of the aggregate video feed for concurrent presentation on a display; and displaying the representation of the aggregate video feed at the display associated with the mobile platform.

12. The method of claim 11, wherein encoding the mobile digital television signal comprises encoding the broadcast media stream in accordance with a first transport protocol supported by the Advanced Television Systems Committee A/153 standard and encoding the at least one media file in accordance with a second transport protocol that is supported by the Advanced Television Systems Committee A/153 standard and is different transport protocol from the first transport protocol.

13. The method of claim 11, further comprising extracting control data from the mobile video television signal and selecting the set of at least one media file according to the extracted control data.

14. The method of claim 13, further comprising determining a location of the mobile platform, wherein selecting the set of at least one media file comprises employing the extracted control data to select a first media file of a given media file class if the mobile platform is determined to be within a first geographic region and selecting a second media file of the given media file class if the mobile platform is determined to be within a second geographic region.

15. The method of claim 13, further comprising determining a current time at the mobile platform, wherein selecting the set of at least one media file comprises selecting a first media file during a first time period that is defined by the extracted control data and selecting a second media file during a second time period that is defined by the extracted control data, each of the first and second media files belonging to a common media file class and being rendered in a common respective area of the representation of the aggregate video feed at different times based on the control data.

16. The method of claim 13, further comprising:
determining a location of the mobile platform; and
determining a current time at the mobile platform;

wherein selecting the set of at least one media file comprises selecting the set of at least one media file according to the determined location, the current time, and the extracted control data.

17. The method of claim 11, further comprising determining a location of the mobile platform, wherein selecting the set of at least one media file comprises selecting a first media file of a given media file class as the at least one media file if the mobile platform is determined to be within a first geographic region and selecting a second media file of the given media file class as the at least one media file if the mobile platform is determined to be within a second geographic region, each of the first and second media files being rendered in a common respective area of the representation of the aggregate video feed based on the location of the mobile platform.

18. The method of claim 11, wherein the selecting of the set of at least one media file is automatic, such that a first selected media file in the aggregate video feed is replaced with a second selected media file in a given one of the respective areas of the representation of the aggregate video feed without intervention from a user.

19. The method of claim 11, further comprising:
assigning each of the at least one media file to an associated media file class of a plurality of media file classes; and
storing template data that defines a plurality of frames, corresponding to the respective areas of the display, each of the plurality of media file classes and the broadcast media stream operating as a source for a respective one of the plurality of frames and being fed into the respective frame based on which class each of the at least one media file is assigned and based on the template data.

20. A non-transitory computer readable medium storing executable instructions for displaying digital television on a mobile platform, the executable instructions, when provided to a computer, being configured to perform a method comprising:

extracting a broadcast media stream, control data defining rules for a plurality of geographic regions, and at least one media file from a mobile video television signal;

determining a protocol of the broadcast media stream and the at least one media file from the mobile video television signal;

routing the broadcast media stream to a media player and the at least one media file to a media library based on the determined protocol of the broadcast media stream being a first type and the at least one media file being another type;

evaluating the at least one media file to determine a class of media and assigning the at least one media file to a given one of a plurality of predetermined classes based on the determined class of media;

storing the at least one media file in the media library comprising a plurality of media files, each stored in a respective class location according to the assigned media file class of the at least one media file;

determining a geographic location of the mobile platform;

selecting at least one media file from the media library according to the determined geographic location of the mobile platform and the rules defined by the control data;

constructing an aggregate video feed from the selected at least one media file and the broadcast media stream in which the broadcast media stream and each selected media file is rendered in a respective area of the aggregate video feed according to its associated media file class, wherein the broadcast media stream and the respective media class location for each selected media file provides a source to populate a given area of the aggregate video feed for concurrent presentation on a display containing an associated template of a plurality of templates, the associated template defining a plurality of regions of the display as a plurality of frames, the broadcast media stream being associated with a first frame of the plurality of frames and a first media file from the set of the at least one media file being associated with a second frame of the plurality of frames, wherein the template is switched from the associated template of the plurality of templates to another template of the plurality of templates based on the determined geographic location of the mobile platform; and providing the aggregate video feed for presentation on the display.

21. The non-transitory computer readable medium of claim 20, wherein the at least one media file extracted from the mobile television signal corresponds to non-real-time media that is sent separately from a real-time digital video corresponding to the extracted broadcast media stream, the non-real-time media having a resolution that is higher than if the digital video and the non-real-time media were part of the same broadcast video stream.

* * * * *

UNITED STATES PATENT AND TRADEMARK OFFICE
CERTIFICATE OF CORRECTION

PATENT NO. : 8,745,671 B2  
APPLICATION NO. : 12/759373  
DATED : June 3, 2014  
INVENTOR(S) : Jay C. Adrick et al.

Page 1 of 1

It is certified that error appears in the above-identified patent and that said Letters Patent is hereby corrected as shown below:

On The Title Page, Item (73) Assignee should read –  
              Imagine Communications Corp., Englewood, CO (US);  
              Capitol Broadcasting Company, Inc., Raleigh, NC (US)

Signed and Sealed this  
Fourth Day of August, 2015

Michelle K. Lee  
*Director of the United States Patent and Trademark Office*